Sept. 29, 1959  M. WM. LEE, SR  2,906,191
AROMATIC PRESSURE COOKER AND SMOKER
Filed Jan. 20, 1958

Maurice Wm. Lee, Sr.
*INVENTOR.*

2,906,191
AROMATIC PRESSURE COOKER AND SMOKER

Maurice Wm. Lee, Sr., Boley, Okla.

Application January 20, 1958, Serial No. 709,941

2 Claims. (Cl. 99—259)

This invention relates to pressure cookers and more particularly to aromatic pressure cookers wherein wood smoke or other aromatic flavors may be impregnated in foods being cooked under pressure. It has as an object the control of temperature within said cooker without the use of expensive pressure control switches required in cookers of this type by the use of two heating elements in conjunction with said cooker, one element in conjunction with a smoke and steam generator and the other element to maintain a constant temperature within said cooker above the point of condensation of steam vapor at the required pressure. I am aware of the fact that weights are commonly used on pressure cookers to control pressure within said cookers, however in a cooker of this type it is necessary to develop a temperature of approximately 750 degrees F. to char wood and generate smoke. Consequently when the same element is used to generate smoke and steam it is necessary to use a pressure control switch in conjunction with a non-escapement type of pressure vessel to maintain the proper pressure.

Another object of this invention is to provide a pressure cooker that cooks principally by steam rather than steam and heat convection and direct conduction, thus retaining the flavor juices within the food being cooked instead of boiling them out resulting in a superior flavor than that obtained in a conventional pressure cooker. These and other objects are accomplished in the manner hereinafter more fully disclosed in the following description when taken in conjunction with the accompanying drawings wherein.

Like characters of reference designate like parts in the figures of the drawings in which they occur.

Figures 1, 4:
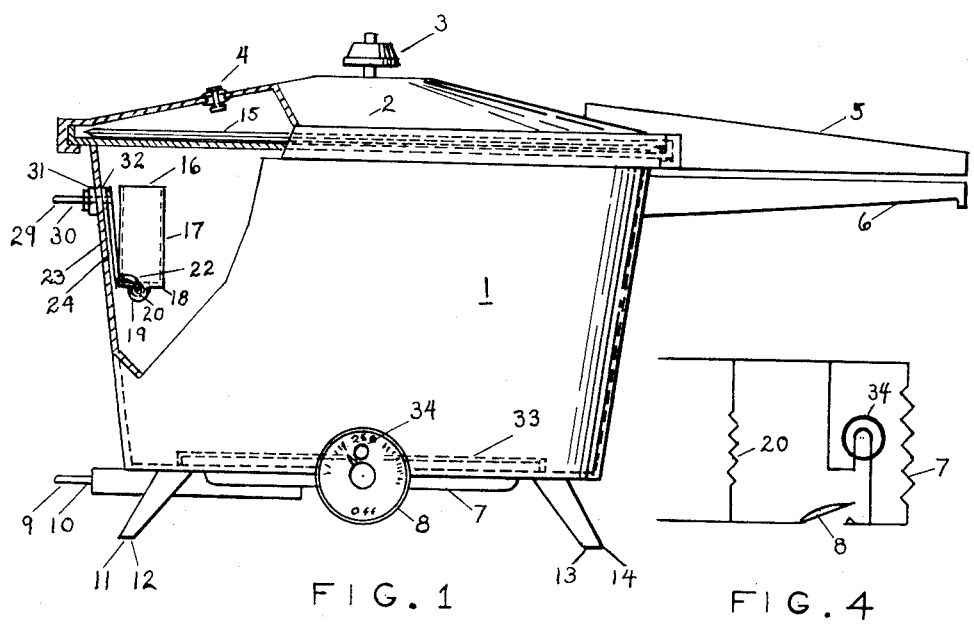
Fig. 1 is an assembly elevation of the cooker, partially sectioned.
Fig. 4 is a schematic wiring diagram.
Figures 2, 3:
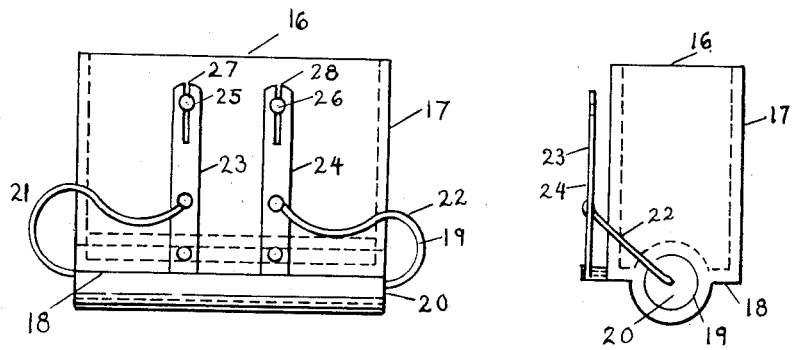
Fig. 2 is a side elevation of the smoke and steam generator.
Fig. 3 is an end elevation of the steam generator.

This invention consists of a conventional electric pressure cooker comprising a chamber 1, having a lid 2, a pressure control weight 3, an air escapement valve 4, handles 5 and 6, a heating element 7, cast in the bottom of vessel 1, or mounted under vessel 1, a variable thermostat 8. Operating in conjunction with said heating element 7 are connecting terminals 9 and 10 for attachment plug not shown, and vessel 1 supported by legs 11, 12, 13, and 14.

While any of the known methods common to the art may be used for effecting a vapor tight closure between the lid 2 and the chamber 1, a gasket or sealing ring 15 is disclosed in Fig. 1

Within said chamber 1 and preferably mounted on the walls thereof is a steam and smoke generator 16. Said steam and smoke generator may be of any convenient shape and may be suspended from the lid or placed at any desirable location within said chamber 1, but as disclosed herewith it comprises a rectangular upwardly disposed chamber 17, having a bottom 18 with a horizontal cylindrical opening 19, within which is carried a tubular heating element 20, having terminal leads 21 and 22. Mounted on one side of said generator 16 and insulated therefrom by means commonly known to the art are terminal strips 23 and 24. Said terminal strips 23 and 24 have holes 25 and 26 drilled near their upper extremity and longitudinal slots 27 and 28 extending from their upper extremity below holes 25 and 26 to make a spring tight connection when engaged with terminal rods 29 and 30. Terminal rods 29 and 30 are mounted through holes 31 and 32 through the walls of chamber 1 and are insulated therefrom by means commonly known to the art. A trivet 33 may be placed on the bottom of chamber 1 to keep food placed therein from being in too close proximity to the heated bottom. Mounted preferably in the thermostat dial is a pilot light 34 to indicate when the heating element 7 is in operation.

In operation food to be cooked is preferably placed in a pan or wrapped in metal foil and placed within chamber 1, on the trivet 33. Generator 16 is filled with water and hickory shavings or other aromatic burnable substance. An electric current is applied to terminals 9 and 10 and 29 and 30. No water is placed in the bottom of the cooker. The only function of element 7 is to maintain the walls and bottom of chamber 1 at the proper temperature to prevent condensation. Thermostat 8 is set to maintain a temperature of approximately 250 degrees.

When the temperature of generator 16 reaches approximately 212 degrees the water within same will boil and generate steam. When all the water has boiled off and the generator has attained a temperature of approximately 750 degrees, the hickory shavings will be pyrolyzed to a charcoal state by a process of distillation of its volatile products and a decomposition of the remaining organic portions for producing a smoke like aroma which permeates the food being cooked.

This cooker does not function in the manner of an ordinary pressure cooker in that the cooking is done almost entirely by steam, and a longer time must be allowed for cooking. When the proper time has elapsed the pressure weight 3 is raised slightly with a fork or other object until most of the steam has escaped and pressure has dropped. Weight 3 is then removed and lid 2 removed and the food is taken out.

Obviously changes may be made in the shape, design, method of closure and arrangement of the component parts of this invention and I intend to include all variations that may fall within the scope of the appended claims.

I claim:

1. A pressure cooker, comprising: an upwardly open substantially cylindrical pressure chamber; a lid for closing and sealing said chamber, said lid having a vent opening; weight means for closing the vent and maintaining the pressure within said chamber constant; a first electrical resistance heating element secured to the lowermost surface of said chamber; an upwardly open substantially rectangular chamber for holding water and flavoring means, said rectangular chamber having a centrally bored cylindrical boss forming a part of the bottom thereof; an electrical resistance cylindrical heating element disposed with the bore of said boss; means for removably mounting said rectangular chamber within said cylindrical chamber on the wall thereof adjacent its open end, said means including a pair of electrical terminal rods projecting through the wall of said cylindrical chamber and electrically insulated therefrom, spaced-apart vertically disposed terminal strips secured by their lower end portions to said rectangular chamber and connected with said cylindrical heating element, each said terminal strip having a bifurcated upper end portion adapted for resiliently engaging the inwardly disposed ends of said terminal rods; and a source of electrical energy connected with said terminal rods and said first heating element.

2. A pressure cooker, comprising: an upwardly open pressure chamber; a lid for closing and sealing said chamber, said lid having a vent opening; weight means for closing the vent and releasably maintaining the pressure within said chamber constant; a first electrical resistance heating element secured to the lowermost surface of said chamber; an upwardly open substantially rectangular chamber for holding a quantity of water and flavoring substance, said rectangular chamber being removably secured to the inner surface of the wall of said pressure chamber adjacent its open end; said rectangular chamber having a centrally bored boss forming a portion of the bottom thereof; an electrical resistance cylindrical heating element disposed within the bore of said boss for heating the contents of said rectangular chamber; terminal rods projecting through the wall of said pressure chamber and electrically insulated therefrom, said terminal rods being connected with said cylindrical heating element; and a source of electrical energy connected with said terminal rods and said first heating element.

References Cited in the file of this patent

UNITED STATES PATENTS

| | | |
|---|---|---|
| 1,947,232 | Smith | Feb. 13, 1934 |
| 2,123,040 | Hanak | July 5, 1938 |
| 2,205,914 | Stafford | June 25, 1940 |